United States Patent [19]
Van Der Bel

[11] Patent Number: 5,163,420
[45] Date of Patent: Nov. 17, 1992

[54] HEADLIGHT SYSTEM

[76] Inventor: Frans G. Van Der Bel, P.O. Box 942, Southbridge, Mass. 01550

[21] Appl. No.: 674,699

[22] Filed: Mar. 25, 1991

[51] Int. Cl.⁵ ............................................. A61B 1/06
[52] U.S. Cl. .................................... 128/23; 362/105
[58] Field of Search ................ 128/23; 362/105, 106, 362/107

[56] References Cited

U.S. PATENT DOCUMENTS

| | | | |
|---|---|---|---|
| 3,947,676 | 3/1976 | Battilana et al. | 128/23 X |
| 4,104,709 | 8/1978 | Kloots | 362/105 |
| 4,516,190 | 5/1985 | Kloots | 362/106 X |
| 4,533,984 | 8/1985 | Gatton | 362/106 X |
| 4,616,257 | 10/1986 | Kloots | 362/105 X |

Primary Examiner—John J. Wilson
Assistant Examiner—Jeffrey A. Smith
Attorney, Agent, or Firm—Blodgett & Blodgett

[57] ABSTRACT

A headlight system for directing light to a work site including a head cap or base, a main housing mounted on the base and positioned on the forehead of the user, and a cartridge or optical housing mounted for axial rotation within the main housing, about an axis which is horizontal and perpendicular to the line of sight of the user. Light from a fiber optic conduit is directed into the housing along the horizontal axis and reflected forward by a mirror and lens system. The final direction of light is variable within a plane and perpendicular to the horizontal axis.

6 Claims, 4 Drawing Sheets

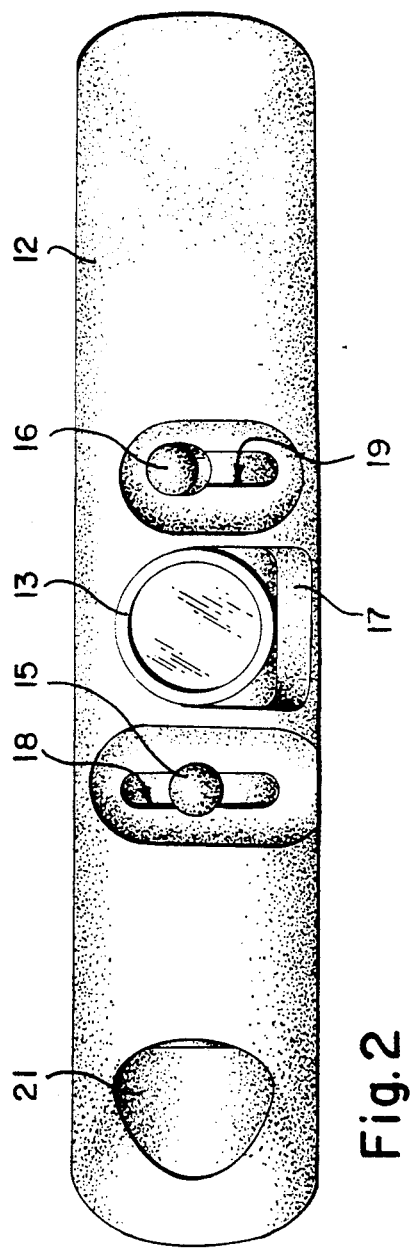
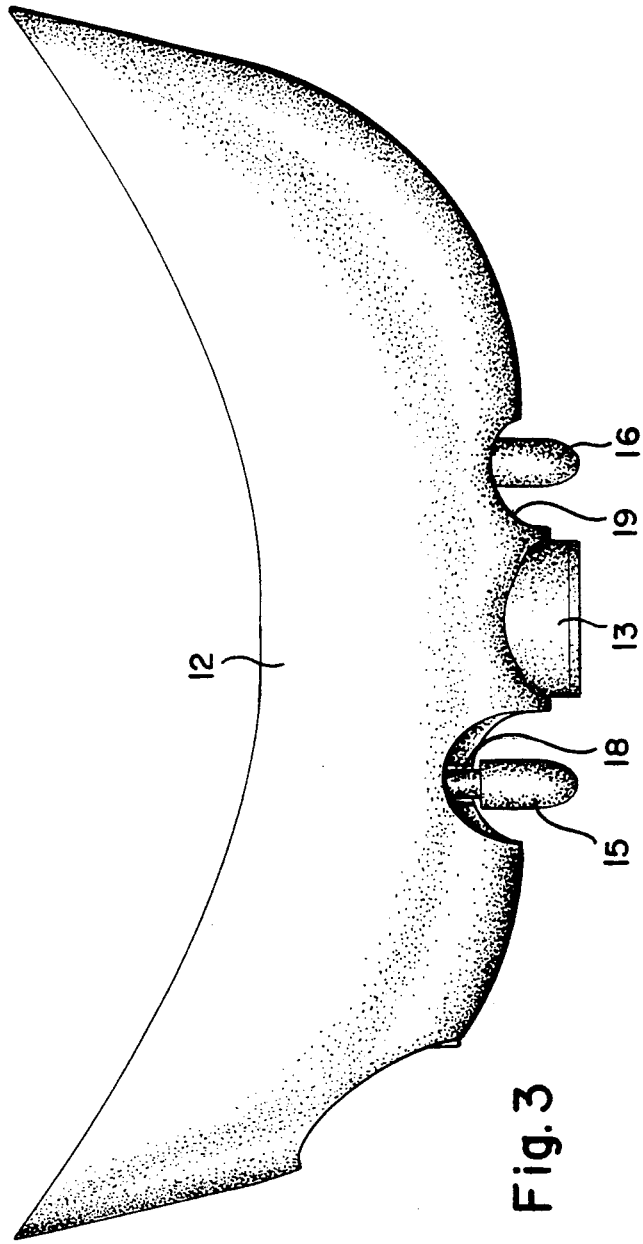
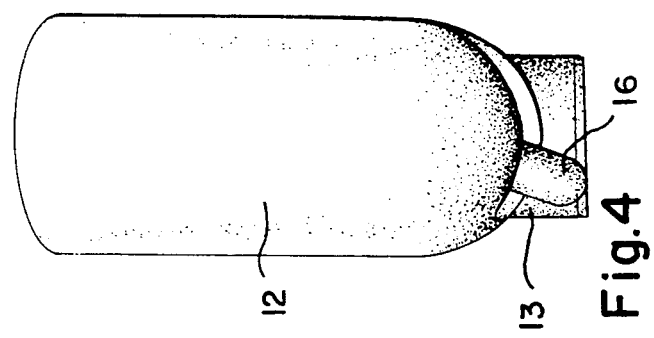

HEADLIGHT SYSTEM

BACKGROUND OF THE INVENTION

There are many circumstances where it is very important to be able to illuminate a particular area which is being optically examined. The problem of illuminating a work site is particularly difficult when the work site is at the bottom of a deep hole or surrounded by material which obscures normal room light from illuminating the work sight. This situation is particularly common in connection with surgery. As surgical techniques allow medical procedures in deeper and deeper surgical openings of narrower and narrower diameter, the problem becomes increasingly difficult.

Ideally, in the typical surgical situations, it is desirable to place the light source on the bridge of the surgeons nose and precisely between the surgeon's eyes. This would provide the minimum of shadowing and provide a light source which is almost coaxial with the surgeon's vision.

Traditional sources of light, however, such as incandescent bulbs, do not lend themselves well to positioning at approximately between the surgeon's eyes. Such traditional light sources had the problem that, if they were large enough to provide sufficient light, they were too bulky and obscured the surgeon's vision. On the other hand, if they were made smaller, frequently they did not provide sufficient light. Furthermore, they were frequently heavy and they also generated a great deal of heat. Finally, most traditional light sources were electrically powered and it was generally considered poor practice to place electric circuits in near vicinity to the surgical field, for a number of reasons. Most specifically, the potential explosive atmosphere frequently present in the area of anesthetized patients and the serious danger of electric shock associated with vulnerable patients made traditional light sources inappropriate.

A major breakthrough in surgical headlights occurred with the development of high-powered fiber optic light sources. In the fiber optic headlight system, a very high-powered light source was placed a significant distance away from the surgical field. The light was fed from a fiber optic cable from the light source, over the top of the surgeon's head, and down to a reflective headlight positioned at a distance in front of the surgeon's forehead. This headlight was mounted on a surgical cap or headband with various adjustable mounting devices in order that the headlight light beam might be directed to the place where the surgeon desired the light to fall. The typical surgical headlight was necessarily mounted a significant distance in front of the surgeon's face in order to provide the adjustable mounting devices which allowed the headlight to be directed as desired. Furthermore, the fiber optic cable typically came over the top of the surgeon's head, entered the top of the headlight on its upper surface, and then was directed to a 45° mirror which directed the light forward and through a lens. Necessarily, this design required that the headlight itself be a significant distance ahead of the surgeon's face. This cantilever position put a significant strain on the muscles of the surgeon's neck and shoulders, which would support the head and this additional weight of the headlight, because of its significant cantilevered effect.

Furthermore, the further the headlight was ahead of the surgeon's face, the more likely the headlight would obscure the surgeon's vision in certain circumstances.

These and other difficulties experienced with the prior art devices have been obviated in a novel manner by the present invention.

It is, therefore, an outstanding object of the invention to provide a headlight system which is capable of being positioned very close to the surgeon's forehead in order to minimize the physical strain on the surgeon's neck and shoulder muscles associated with supporting the weight of the headlight system.

Another object of this invention is the provision of a headlight system which is very compact and light and thereby minimizes the tiring of the surgeon.

A further object of the present invention is the provision of a headlight system which is mechanically simple and very infrequently prone to mechanical problems.

It is another object of the instant invention to provide a headlight system which is capable of being adjusted by the surgeon so that the beam of light and its intensity can be placed precisely where and at the precise intensity that the surgeon desires and yet that positioning can be easily maintained.

A still further object of the invention is the provision of a headlight system which, because of its compact design which does not extend far from the surgeon's face, reduces the possibility of contact between parts of the headlight and various peripheral objects within the surgeon's area of movement, for example various eye pieces, microscopes or other equipment. Of particular concern is the avoidance of contact between the headlight and co-surgeons or assistants. Such contact could not only interfere with or injure the other party, but also it could shift the headlight off target during a critical movement.

With these and other objects in view, as will be apparent to those skilled in the art, the invention resides in the combination of parts set forth in the specification and covered by the claims appended hereto.

SUMMARY OF THE INVENTION

This invention is a fiber optic-based headlight system particularly useful by surgeons during deep surgery. The system includes a mounting cap or band which is comfortably attached to the surgeon's head and a main housing attached to the front of the cap. The main housing has a side-mounted fiber optic cable adapter selected to accept light from a fiber optic cable from a remote fiber optic light source. The adapter accepts the light along a horizontal access perpendicular to the line of sight of the surgeon. From the adapter, the light is guided through a condenser lens system which collimates the light. The light then passes through an iris diaphragm which controls the amount of light and the diameter of the light beam (and thereby the diameter of the final lighted target area) which passes through it by means of an iris adjusting post which is exterior to the main housing and accessible to the surgeon's hands. The light is then directed at a 45° mirror which is mounted for rotation about the axis of the incoming light while maintaining the 45° relationship to the light. From the mirror, the light is directed through an objective lens which is mounted in the same housing as the mirror so that, as the mirror housing is rotated about its horizontal axis, by a directing pin which is accessible to the surgeon, the vertical movement of the lens and therefore the light which exits from the lens can be adjusted toward various points before the surgeon's face.

This geometry allows the entire headlight system to be positioned very closely to the surgeon's forehead.

BRIEF DESCRIPTION OF THE DRAWINGS

The character of the invention, however, may be best understood by reference to one of its structural forms, as illustrated by the accompanying drawings, in which:

FIG. 2 is a front elevation view of the main housing of the present invention, FIG. 3 is a plan view of the main housing shown in FIG. 2, FIG. 4 is a side view of the main housing shown in FIG. 2.

DESCRIPTION OF THE PREFERRED EMBODIMENT

Figure 1:
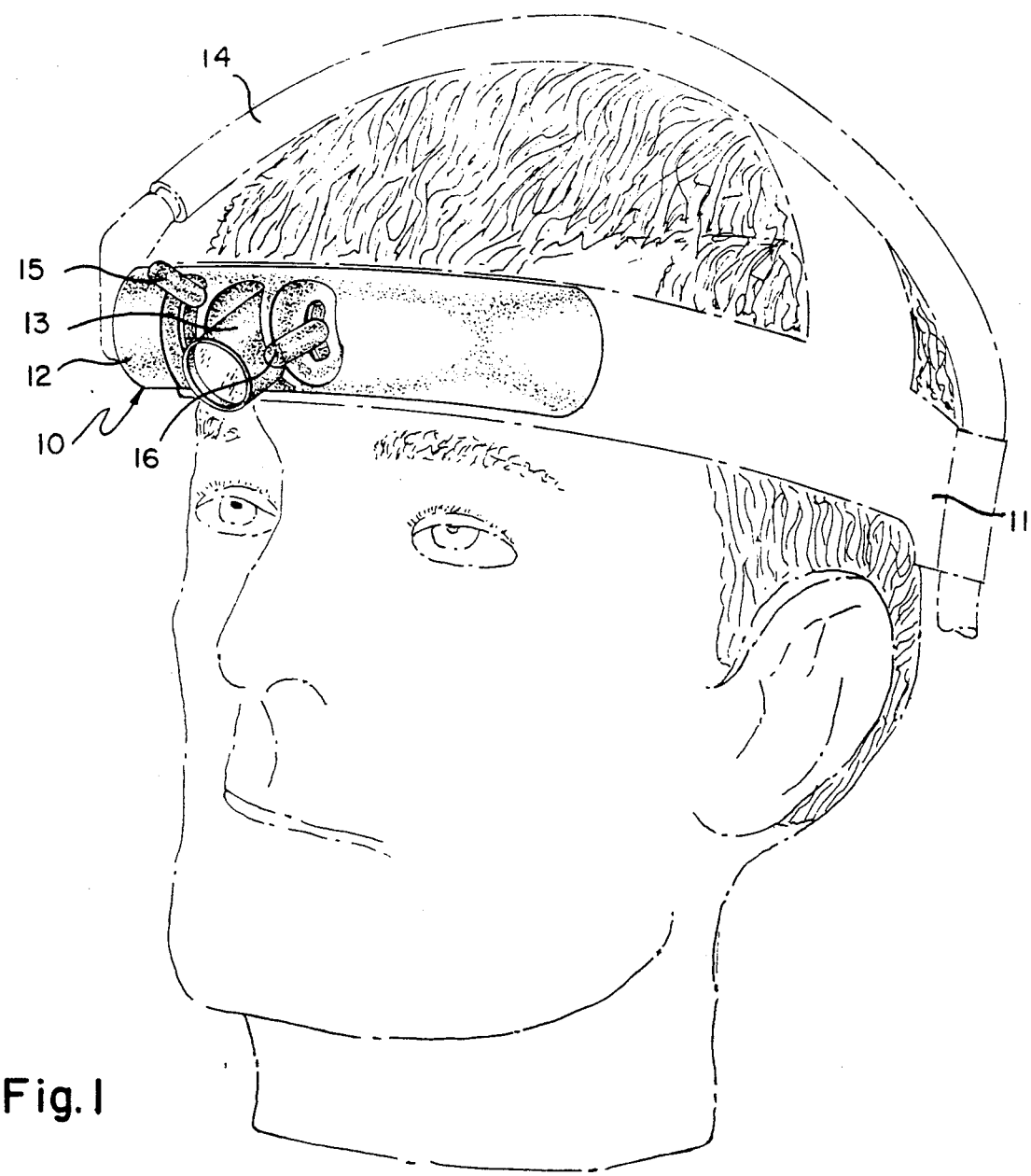
FIG. 1 is a perspective view of the headlight system of the present invention as it would be positioned on the head of a user, such as a surgeon.

Referring first to FIG. 1, in which are best shown the general features of the present invention, the headlight system, denominated generally by the numeral 10, is shown to include a head cap 11, a main housing 12, mounted on the front surface of the head cap 11, a lens system 13, mounted in the main housing, and a fiber optic light conduit 14 which introduces light to the main housing 12.

FIG. 1 also shows a light intensity control pin 15 which can be pivoted up and down by the user to control the amount of light which is provided by the system. FIG. 1 also shows a light direction control pin 16 which can be moved up and down about a pivot point within the main body to control the axial movement of the lens system 13 in order to direct the light which exits from the lens system 13 to direct light to the specific location desired by the user.

FIG. 2 is a front view of the main housing 12. It can be readily seen that the lens system 13 is mounted in the main housing 12 and extends into a slot 17 which slot 17 allows the lens system to move from the position shown in FIG. 2 downward to lower positions.

Light intensity control pin 15 is mounted in the housing and extends through a slot 18 so that it can be pivoted upward and downward.

Light direction control pin 16 is mounted in the housing and extends through pin slot 19 which allows it to pivot from its horizontal position downward along with the movement of the lens system 13.

FIG. 2 also shows the cable opening 21 through which the fiber optic cable passes in order to be connected into the optics within the housing 12.

FIG. 3 shows a plan view of the top of the main housing 12. Light intensity control pin 15 extends from pin slot 18. Light direction control pin 16 extends from pin slot 19. The lens system 13 is only slightly visible.

FIG. 4 is a side view of the main housing 12. The lens system 13 and the light direction control pin 16 extend from the housing.

Figure 5:
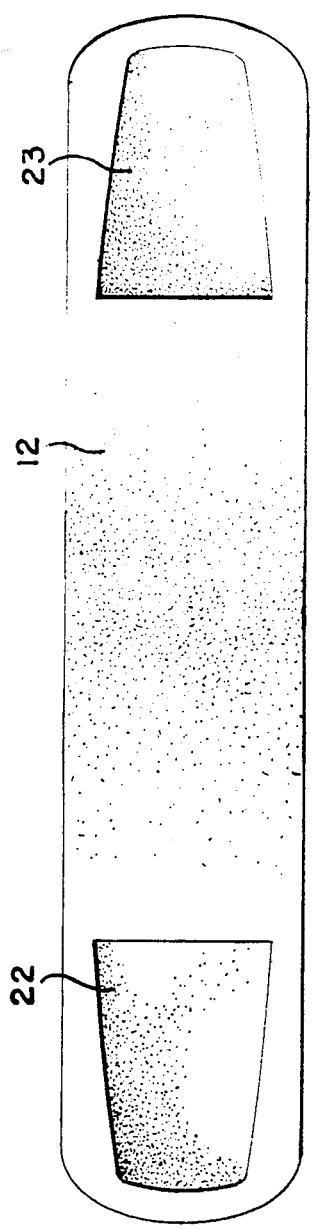
FIG. 5 is a rear elevation view of the main housing separated from the cap or band which would normally hold it to the user's head.

FIG. 5 shows a rear view of the main housing 12. Pockets 22 and 23 are normally not visible when the system is in use and are simply provided to reduce material usage.

Figure 6:
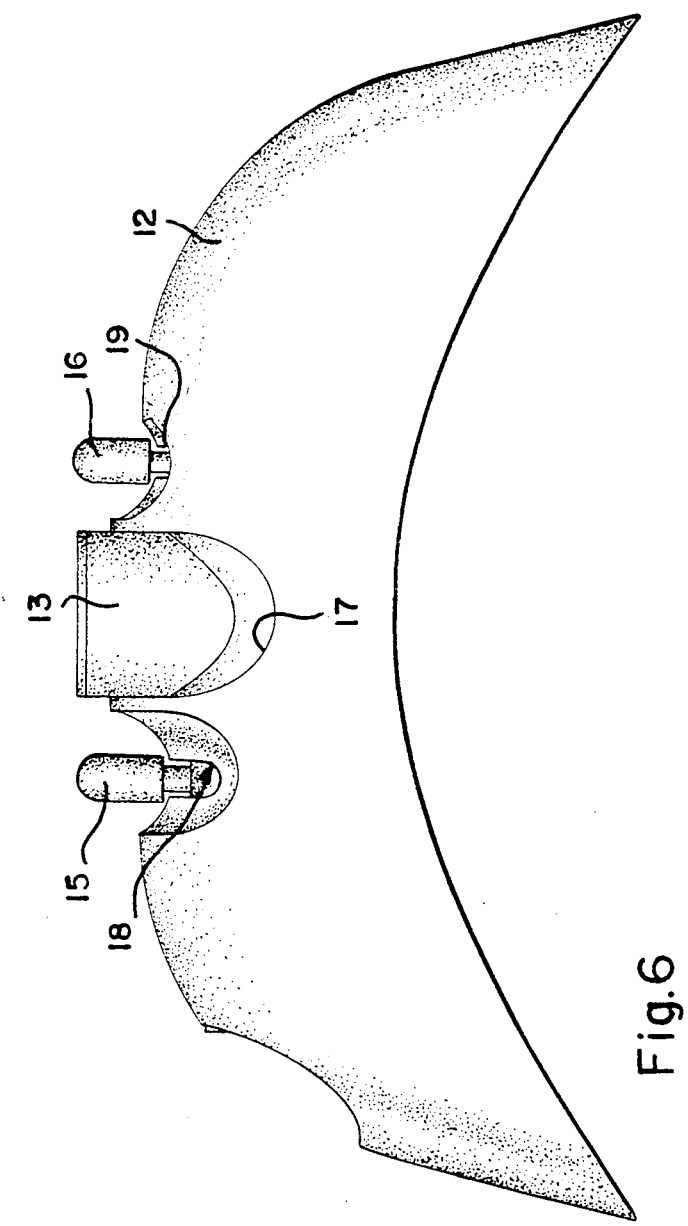
FIG. 6 is a bottom view of the main housing.

FIG. 6 shows a bottom view of the main housing 12. The lens system 13 extends from the lens slot 17. The light intensity control pin 15 extends from the pin slot 18. The light direction control pin 16 extends from the pin slot 19.

Figure 7:
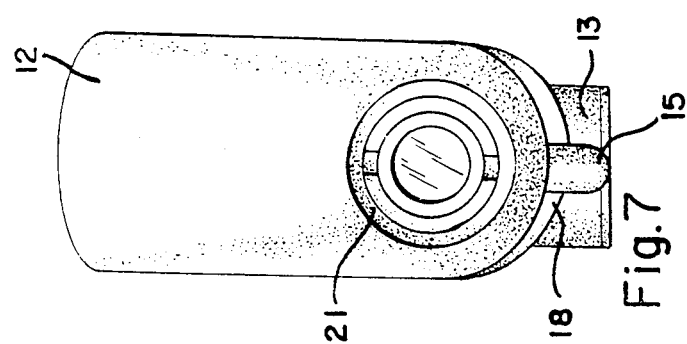
FIG. 7 is a side view of the main housing.

FIG. 7 is a left side view of the main housing 12. Light intensity control pin 15 extends from pin slot 18. Lens system 13 extends from the housing. The cable opening 21 can be seen in this view.

Figure 8:
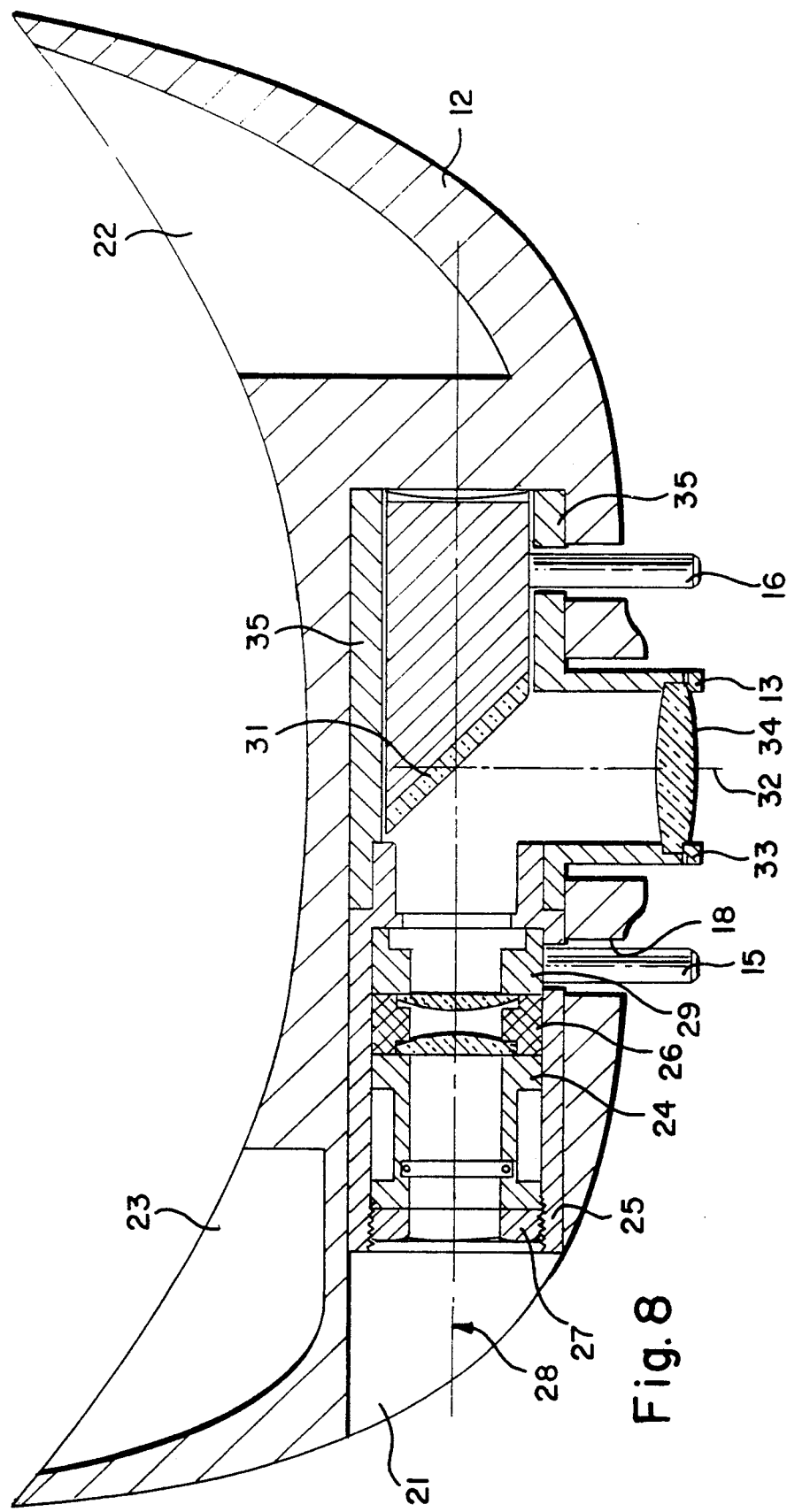
FIG. 8 is a diagrammatic representation, shown in section, of the optical system which embodies the principles of the present invention, shown as a plan view seen from the top.

FIG. 8 is a plan view of the main housing, roughly corresponding to FIG. 3. However, FIG. 8 has been sectioned by a horizontal plane passing through the axis of the optical system. The main housing 12 is shown with its pockets 22, 23 and its cable opening 21. A fiber optic cable which provides a source of light is fed into opening 21 and engages a fiber optic cable adapter or connector 24 which is held in optical housing 25 by retaining nut 27. The light from the fiber optic cable locked into the adapter 24 is fed to a condenser lens system 26 which collimates and diffuses the light. The light then continues along a first horizontal optical axis 28 through an iris diaphragm system 29. The iris opening diameter is controlled by light intensity control pin 15 as that control pin pivots about the first optical axis 28 and in pin slot 18. The light continues along the optical axis 28 until it impinges on mirror 31 which is set at a 45° angle to the optical axis 28. The light is reflected off of mirror 31 and is directed along a second optical axis 32 which passes out of the housing through lens system 13. Lens system 13 includes barrel 33 and objective lens 34.

The lens system 13, the mirror 31 and the light direction control pin 16 are all fixedly mounted with respect to a second optical housing 35. The second optical housing 35 is mounted in the main housing 12 and adapted for axially rotation about the first optical axis 28. As a result, the pivoting motion of light direction control pins 16 causes the second optical housing 35, the lens system 13 and the mirror 31, to pivot and thereby to change the direction of the second optical axis 32 in a vertical plane which plane essentially passes between the eyes of the user.

The most important aspect of the geometry of this invention is that it allows the entire housing and associated optics to be very close to the user's forehead and thereby minimize the cantilever effect normally present in directable headlights. In normal directable headlights, the pivoting mechanism, typically a ball-and-socket arrangement, is positioned between the rearward position of the housing and the head base. Because the pivoting mechanism is of substantial size, its position forces the housing to be a substantial distance in front of the user's forehead. The present geometry allows the separation between the optics and the user's forehead to be minimal. More specifically, the only thing separating the rearmost element of the optics (the cartridge that holds the mirror) and the user's forehead, in the rear wall of the main housing (which would be of minimal thickness), and the head base or band over the user's forehead. The band would include the structural material and probably a skin-contacting liner that would deal with forehead perspiration. Thus the light is very close to the user's head.

The operation of the present invention will now be readily understood by those ordinarily skilled in the art. The user essentially places the head cap 11 onto his or her head and adjusts the head cap so that the main housing is positioned on the user's forehead and the lens system is essentially positioned over the nose of the user. The light conduit 14 provides light, from a remote light source, and through an 80° angle adapter, which is directed to output light along the horizontal first optical axis 28 and into the optical system of the main housing. The user can pivot light direction control pin 16 to direct the light beam which is passing along the second optical axis 32 directly to the desired work site. The user can also pivot light intensity control pin 15 to control the intensity of light which is directed to the work site.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to be secured by Letters Patents is:

1. A headlight system for use on the head of a user and for conducting light from a light source, and from a fiber-optic conduit having an exit port that provides a beam of light along a horizontal axis, and for eventually directing a beam of light to a target, the system comprising:
    (a) a head base adapted to be positioned on the head of the user,
    (b) a main housing mounted on the based and adapted to be positioned over the forehead of the user,
    (c) a cartridge in the main housing and adapted to be rotated about a horizontal cartridge axis,
    (d) an input port mounted in the housing and adapted to hold the exit port of the conduit and direct the beam therefrom into the cartridge along the cartridge axis,
    (e) a mirror mounted in the cartridge and adapted to redirect the beam as it comes along the cartridge axis substantially perpendicular to the cartridge axis,
    (f) and actuator which is adapted to rotate the mirror about the cartridge axis so that the beam is directed to the target, and
    (g) an objective lens which is mounted on the cartridge between the mirror and the target and is adapted to rotate with the mirror and maintain its position between the mirror and the target.

2. A headlight system as recited in claim 1, wherein a condenser is provided between the input port and the mirror.

3. A headlight system as recited in claim 1, wherein a light intensity controller is provided between the input port and the mirror.

4. A headlight system as recited in claim 1, wherein the intensity of the light and the beam spot size can be varied by the user by means of an intensity control device mounted on the main housing.

5. A headlight system as recited in claim 1, wherein the rotation of the cartridge is controlled by a direction device mounted on the housing.

6. A headling system as recited in claim 1, wherein the cartridge is formed of a right circular cylinder with a geometric axis which is coincident with the cartridge axis about which the cartridge rotates.

* * * * *